United States Patent [19]

van der Lely

[11] Patent Number: 5,771,837
[45] Date of Patent: Jun. 30, 1998

[54] IMPLEMENT FOR AUTOMATICALLY MILKING ANIMALS

[75] Inventor: Olaf van der Lely, Steinhausen, Switzerland

[73] Assignee: Maasland N.V., Netherlands

[21] Appl. No.: 605,180

[22] PCT Filed: Jun. 12, 1995

[86] PCT No.: PCT/NL95/00207

§ 371 Date: Feb. 16, 1996

§ 102(e) Date: Feb. 16, 1996

[87] PCT Pub. No.: WO95/35028

PCT Pub. Date: Dec. 28, 1995

[30] Foreign Application Priority Data

Jun. 17, 1994 [NL] Netherlands ............................ 9400992

[51] Int. Cl.⁶ ...................................................... A01J 5/00
[52] U.S. Cl. ............................................................ 119/14.02
[58] Field of Search ............................. 119/14.01, 14.02, 119/14.03, 14.08

[56] References Cited

U.S. PATENT DOCUMENTS

| | | | |
|---|---|---|---|
| 4,508,058 | 4/1985 | Jacobson et al. ...................... | 119/14.02 |
| 4,838,207 | 6/1989 | Bom et al. ............................. | 119/14.02 |
| 5,069,160 | 12/1991 | Street et al. .......................... | 119/14.02 |

FOREIGN PATENT DOCUMENTS

| | | |
|---|---|---|
| 3702464.5 | 8/1988 | Germany . |
| 0 551 957 A1 | 7/1983 | Netherlands . |
| 8602505 | 10/1986 | Netherlands . |
| 8903163 | 7/1991 | Netherlands . |
| 0091892 A3 | 10/1983 | Sweden . |

OTHER PUBLICATIONS

International Search Report (PCT) for the Netherlands Application No. PCT/NL 95/00207, filed Jun. 17, 1994.

*Primary Examiner*—Thomas Price
*Attorney, Agent, or Firm*—Penrose Lucas Albright

[57] ABSTRACT

An apparatus for automatically milking animals such as cows by a milking machine which is under the control of a computer for automatically connecting teat cups to the teats of the animal, for automatically milking the animal, and for automatically disconnecting the teat cups from the animal. The apparatus is further provided with an animal recognition or identification system which is a communication with the computer system. This computer system is capable of generating a signal when the number of animals that have been milked after the latest milking turn of an animal returning to be milked by the apparatus exceeds a predetermined numerical value. This signal generated by the computer denotes that this particular animal is eligible to be milked. Otherwise, the animal is lead from a pre-milking selected compartment into an area away from the apparatus. Alternatively, a similar signal can be generated when the quantity of milk that has been obtained by the milking machine since the latest turn of the animal returning to the apparatus again to be milked exceeds a predetermined numerical value. The amount of time which must elapse before an animal, once milked, can be milked again can be affected by a number of factors including the percentage of the herd that has already been milked and/or the quantity of milk produced since the animal was last milked or, for a particular animal, its physical condition, the course of its lactation, a history of its milk yield, the extent of its activity, the course of its estrous cycle, the historical data on the conductivity of its milk, the temperature of its milk, its somatic cell count, and the frequency in which the animal goes to the milking parlor, such factors being combined or weighted as appropriate.

27 Claims, 1 Drawing Sheet

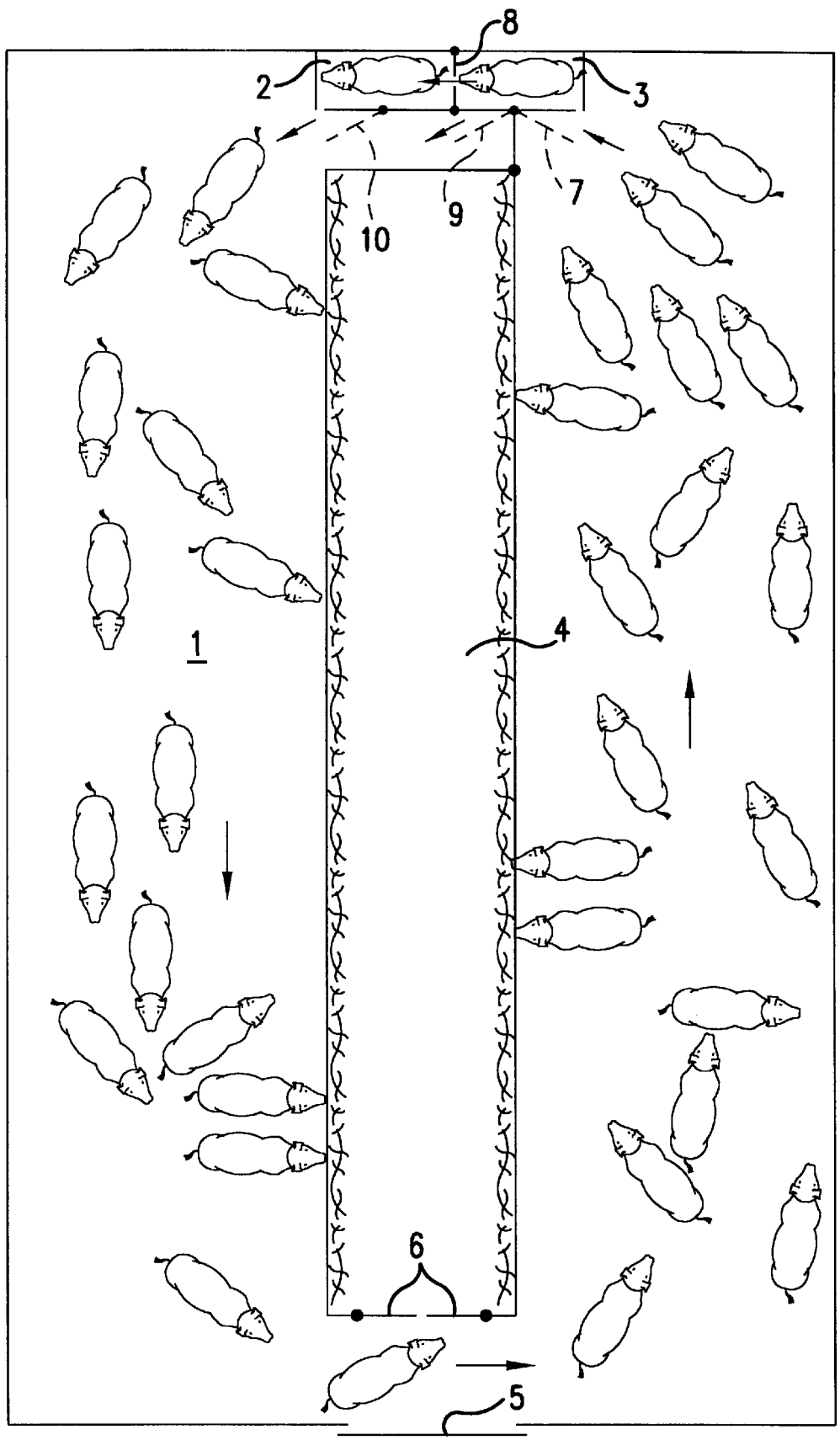

IMPLEMENT FOR AUTOMATICALLY MILKING ANIMALS

FIELD OF INVENTION

The present invention relates to an apparatus for automatically milking animals, such as cows, by means of a milking machine under the control of a computer system that automatically connects teat cups to the teats of an animal, automatically milks the animal, and automatically disconnects the teat cups from the animal, which apparatus is further provided with an animal recognition system in communication with said computer system.

BACKGROUND OF THE INVENTION

When the automatic milking apparatus is placed in an area where the animals to be milked are allowed to move about freely and are enticed to enter a milking parlor in order to be milked because they are fed fodder concentrates while in the milking parlor, there is need for criteria for determining whether an animal which reports to the milking parlor should actually be milked. An animal that has been milked shortly before should not be milked again. Accordingly, a need exists in an apparatus for automatically milking animals for a means of distinguishing between an animal that arrives at the milking parlor too soon to be milked again and an animal that, after her last milking, should be milked again, whereby the apparatus automatically milks the latter but not the former.

SUMMARY OF THE INVENTION

To meet the above need, the invention described herein is characterized in that an animal is allowed to be milked again if a signal is generated by the computer system that the number of animals which have been milked after her last milking exceeds a defined numerical value. Thus, the number of animals milked after the last milking of an animal which reports at the apparatus is used as a criterion to determine whether or not that animal will be automatically milked. If an insufficient number of other animals has been milked after the last milking, then the animal reporting at the milking parlor will not be milked; instead she will be sent elsewhere or returned to the area where she came from.

Although it is possible to provide separate counting means to keep count of the number of animals milked after the last milking of the animal reporting at the apparatus, it is preferable to record this number in the computer system. The numerical value against which this number is compared, in accordance with the invention, equals a proportion, that is approximately two-thirds of the total number of animals which is to be milked by the apparatus. By coupling the defining numerical value to the number of animals to be milked by the apparatus, it is feasible to prevent certain animals from unintentionally being milked too frequently. On the other hand, this numerical value can also be prescribed individually for each animal and, for example, be made conditional on the extent to which the lactation period of the animal reporting at the apparatus has elapsed. In that case, the numerical value at the beginning of the lactation may be equal to approximately one-half of the number of animals being milked by the apparatus. By including in the computer system a lower numerical value as a criterion for particular animals, especially animals at the beginning of their respective lactation periods, these animals are milked more often than other animals.

Apart from the number of animals that has been milked after the last milking of an animal which reports at the milking parlor, a different criterion may be used to decide whether or not an animal is to be milked. Therefore, in accordance with the invention, an apparatus for automatically milking animals as described above may be characterized in that an animal is allowed to be milked again if a signal is generated by the computer system that the quantity of milk which has been obtained from other animals after the last milking of said animal exceeds a defined numerical value. In other words, an alternative criterion to decide whether or not an animal reporting at the milking parlor is allowed to be milked, can be the quantity of milk obtained from other animals since the last milking of the relevant animal. Although, here too, such quantity can be recorded by means of a separate measuring apparatus which is coupled to a milk meter, for example a milk meter provided in the apparatus, it is again preferable to record and compute this quantity of milk in the computer system of the automatic milking apparatus. The two criteria mentioned can, of course, be used in combination.

When the condition for generating the signal occurs, the animal in the milking parlor is automatically milked, and when this condition has not yet occurred, the animal in the milking parlor is caused to depart without being milked. However, it is preferable that when the condition has occurred, the animal be admitted to a milking parlor whereas, if the condition has not occurred, the animal not even be admitted to the milking parlor.

To be able to determine whether or not an animal reporting at the milking parlor is to be allowed to be milked, the animal should, of course, be identified. An animal recognition system is used for this purpose. Any recognizable characteristics of the animal itself or any means for recognition provided on the animal are suitable for identification; however, in practice, a transponder attached to a strap round the neck of an animal is frequently used. This transponder is suitable for operation in conjunction with a sensor connected to the computer system. This sensor is disposed in or in the vicinity of the milking parlor. This means that as soon as the animal has approached the milking parlor within a sufficiently short distance or has entered a selection compartment she is identified whereby, using one of the criteria mentioned hereinbefore and data in the computer system, it is decided whether or not the animal will be allowed to be milked. When use is made of a selection compartment or box which is entered by the animal before she can be admitted to the milking parlor, this sensor is preferably disposed in the selection compartment. When the animal has entered the selection compartment and has been identified, and it is established that the condition for the generation of the of the aforementioned signal has been fulfilled, the animal is then admitted to the milking parlor in order to be milked. But, when the condition for the generation of the above-mentioned signal has not occurred, the computer system generates a different signal which causes that the animal to be led from the selection compartment directly to the area where otherwise she would have been sent to via the milking parlor had she been milked. In a concrete embodiment of the invention, for this purpose the selection compartment is provided with an entry door, a first exit door to the milking parlor and a second exit door giving access to that part of the area to which the exit door of the milking parlor provides access. The first exit door is then opened by means of the first mentioned signal generated by the computer, while the second exit door is opened by means of the other signal generated by the computer.

The selection compartment and the milking parlor are preferably arranged in a housing system; this may then be arranged so that an animal leaving the milking parlor or selection compartment has to travel a certain minimum distance to report again at the milking parlor or the selection compartment.

The invention further relates to a method of automatically milking animals which move about freely in a housing system or in a pasture and on their own volition can individually to go to a milking parlor provided with a milking robot and to be possibly milked upon being identified by an animal recognition system connected to a computer and approved for milking signalled by the latter.

Such a method is known from European patent Applications EP 0 091 892. In said document it is indicated that an animal reporting at or near the milking parlor will not be actually milked until it has been established that a predetermined time has elapsed since the last milking of this animal. However, a method wherein the only criterion is whether or not a minimum time has elapsed since the last milking has elapsed for making a decision whether or not an animal can again be milked is not flexible and does not guarantee that the animal will be milked at times consistent with an optimum milk yield. Hence, in accordance with the invention, the method as set forth in the preceding paragraph characterized that an animal is milked when, following the last milking of this animal, the particular period of time that has elapsed, should also take into account data on the physical condition of the animal or the quality of the animal's milk or both. In other words, a system wherein the decision whether or not an animal reporting at or near the milking parlor is to be milked, is conditional on a passage of a time which is improved by taking into account ongoing data concerning the animal's physical condition or the animal's milk quality or both, so that the distinctive characteristics of each individual animal is considered in making the decision.

A first criterion of importance in deciding whether an animal is allowed to be milked is the course of the lactation period. For each animal, the lactation period can be recorded in a computer. When the milk production is optimal during the lactation period, an animal can be milked more frequently than when the animal is at a point in the lactation period where the milk production is substantially less.

A second criterion in deciding whether an animal is allowed to be milked is the volume of the animal's milk yield. Each time when an animal is milked, the amount of milk obtained is determined and the milk yield is recorded in the computer. The future milk yield to be expected can be estimated from the historical record on the animal's milk yield stored in the computer; this expected milk yield may be considered in making a decision on whether or not an animal is to be milked, i.e. in the sense that, with a gradual increase in the milk yield, the time which should have elapsed since the last milking can be incrementally shortened.

A third criterion usable in deciding whether an animal is allowed to be milked is the degree of activity of the animal. The animal's activity can be determined by means of an activity meter. Such an activity meter is often a step counter, which is attached to the animal and is read out as she passes by a sensors in the cowhouse, preferably near or at the milking parlor. When such an activity meter is also provided with a memory, into which the counter reading is automatically stored every time when a fixed period of say five minutes, a quarter of an hour, one-half hour or any other desired period of time has elapsed, all these counter readings stored in the memory can be retrieved when the animal passes the sensor, and thus a highly accurate picture can be obtained of the animal's activity in the last period, i.e., the period that has elapsed since the animal called at the milking parlor. When the animal, upon being milked, moves about, grazes or takes food and subsequently ruminates, and the animal's activity during the respective periods is measured, then it is practicable to decide whether or not to milk the animal when it reports, on the basis of the animal's activity. After rumination, the number of movements will be relatively less, due to the fact that the udder is heavy and the animal is troubled by this, whereupon the animal is allowed to be milked. On the other hand, when it appears from the course of activity that the animal reports herself at the milking parlor without having had a period of rumination, it can be decided that the animal should not yet be allowed to be milked on account of the course of its activity.

A fourth criterion suitable for application in deciding whether or not the animal is allowed to be milked is the course of its estrous period. For each animal, this too, is recorded in the computer. Milk production will be lower the period of fertility, during which the animal may be inseminated. In the period of fertility the animal's activity is often slightly higher than before; moreover, this also applies to the animal's temperature. Hence, the temperature of the animal may be considered a fifth criterion of importance in deciding whether or not an animal is allowed to be milked; this temperature, which may be measured from the temperature of the milk immediately or almost immediately after it has been withdrawn from the udder, is recorded on an ongoing basis in the computer, so that the animal's average temperature is known.

A sixth criterion of importance in deciding whether or not the animal is allowed to be milked is the conductivity of milk. This, too is determined and stored in the computer during milking. From the historical data on the conductivity of milk at a very early stage in the milking process, a signal is transmitted to the computer that there is a question of (latent) mastitis, in which case the animal should be milked at relatively shorter intervals. In this connection, the ongoing somatic cell count of the milk as recorded in the computer may also be mentioned as a criterion.

Finally, it should be mentioned that the frequency at which the animal goes to the milking parlor can be of importance as a criterion in deciding whether or not an animal is allowed to be milked. A higher frequency of calls at the milking parlor is to be expected when the animal is in heat. When the animal goes more frequently to the milking parlor during this period, it will be determined more often not to milk the animal.

Of course, it is not necessary to use all these criteria at the same time. It is possible to make the determination of whether or not to milk the animal on the basis of a limited number of criteria. But, it is practicable to determine for each animal, taking into accord a number criteria, the period of time that should have elapsed since the preceding milking turn of the respective animal whereupon a new milking turn should be permitted. In other words, this time period is determined by a plurality of the aforesaid data categories relating to the animal or the animal's milk quality or both in combination. Besides, a certain weight factor can be assigned to each criterion or to each category of data on the physical condition of the animal or the milk quality or both. As soon as an animal has been milked and leaves the milking parlor, the minimum time the animal can next be milked can be calculated, so that the period of time that should elapse before the animal can be milked again is immediately fixed.

Usage of a variety of criteria in deciding whether or not an animal can be milked is particularly of importance with a fully automated milking apparatus, wherein not only is the milking itself automated, but wherein also the cleaning or other pre-treatment of at least the teats of an animal as well as the connection of the teat cups to, and their disconnection from, the animal's teats are performed automatically.

BRIEF DESCRIPTION OF THE DRAWING

The invention will now be further explained with reference to the accompanying drawing, which shows a schematic representation of an apparatus according to the invention.

DETAILED DESCRIPTION OF THE PREFERRED EMBODIMENTS

The drawing shows a housing area or system 1, in which there is disposed a milking parlor 2 and a selection compartment 3 along one of the shorter sides of the housing area. Housing area 1 has been divided into two parts segregated by a feed passage 4. Through doors 5 and 6, animal feedstuffs can be put into a manger or feed troughs along the sides of the feed passage. Furthermore, in the housing there may be optionally provided cow cubicles such as along the longitudinal sides of the housing system. These cow cubicles are not, however, shown in the drawing.

Selection compartment 3 has an entry door 7, a first exit door 8 giving access to milking parlor 2, and a second exit door 9 giving access to that part of housing system 1 which is the same as that provided by exit door 10 of milking parlor 2. When selection compartment 3 is unoccupied an animal may enter it. Due to the fact that a sensor is disposed in selection compartment 3 sensor which communicates with a computer system (not shown) and also that each animal bears a transponder attached to a neck strap, which transponder operates in conjunction with the sensor arranged in selection compartment 3, an identification is generated by the sensor and sent to the computer system, so that the animal can be identified. The combination of the transponder on the neck of each of the animals, the sensor in the selection compartment and the computer system constitutes a known animal recognition system. In the computer system, a criterion should be included which is determinative of whether or not an animal in the milking parlor is to be milked or, in other words, whether or not an animal may be admitted from selection compartment 3 to milking parlor 2 to be milked there or is to be sent directly through second exit door 9 to that part of the housing system to which the animal is also sent after the milking turn in milking parlor 2. When the animal passes through second exit door 9 of selection compartment 3 or through exit door 10 of the milking parlor, the animal must walk around feeding passage 4 the housing before she returns to selection compartment 3, whereby an animal not yet eligible for milking is prevented from again returning immediately to the entrance of the selection compartment 3 and re-entering it. It will be appreciated that animal is enticed to enter selection compartment 3 because she is provided fodder concentrates in selection compartment 3 or in milking parlor 2.

The number of animals that has been milked since a particular animal's latest milking turn at the milking parlor may be used as a criterion for being eligible for milking. This number which recorded and calculated in the computer system is compared against a predetermined numerical value. When the recorded number of recently milked animals exceeds this numerical value, following the milking of a particular animal the computer system issues a signal which denotes that this animal is allowed to be milked. The signal produced by the computer system consequently determines that a door 8 from the selection compartment to the milking parlor can be opened, provided that the milking parlor is unoccupied. When the recorded number of other animals that have been milked does not exceed the numerical value, it means the particular animal has returned too soon at the selection compartment and is not eligible for milking. The animal is then caused to exit the selection compartment through exit door 9. This occurs because a different signal is generated by the computer system when the recorded number of animals milked after the particular animal was last milked does not exceed their selected predetermined numerical value.

The quantity of produced milk which has been obtained since the latest milking turn of an animal which has returned to the milking parlor, may be employed as a second criterion for determining whether or not an animal is eligible for milking. Again, when this quantity exceeds a predetermined numerical value, it indicates that a sufficient number of other animals have been milked since the latest milking turn of the relevant animal so that the latter is eligible for milking. In such case, the first signal produced by the computer system that opens exit door 8 from the selection compartment to milking parlor 2 is transmitted from the computer system provided that the milking parlor is unoccupied.

The two criteria discussed above are of major importance when in the milking parlor there is provided a milking machine which is suitable for automatically connecting teat cups to the teats of an animal, for automatically milking the animal, and for automatically disconnecting the teat cups from the animal. In such a system, the farmer has no influence on the order in which the animals, which are indeed allowed to walk freely about in the housing system, go to the selection compartment in order to be directed from there to the milking parlor and to be milked there. Due to the fact that the animals can receive concentrates in the selection compartment or possibly in the milking parlor too, the animals are enticed to enter the selection compartment or the milking parlor. On the other hand, the animals should not be allowed to return again to the selection compartment for admission to the milking parlor within too short a time after they have been milked. By including one of the two abovementioned criteria or both criteria in the computer system, a desired circulation of the animals through the housing system, the selection compartment and the milking parlor occurs.

The milking control system set forth hereinbefore is adaptable to the individual animals. When the number of animals milked after the latest milking turn of the animal reporting at the milking parlor is taken as a criterion, it is feasible by means of a suitably selected numerical value, against which this number is compared, as explained above to determine the extent a certain animal can be milked more frequently than the other animals. On one hand, this numerical value may be fixed, such as at a proportion of the number of animals which should be milked in the milking parlor in the ordinary course of events. The smaller this proportion, the greater the probability of certain animals being milked more frequently than other animals. When it is intended to milk only particular animals more frequently than other animals, the numerical value applicable to the particular animal can be adjusted downwardly. Also the selected numerical value for a particular animal can be dependent on the physiological status of that animal and,more particularly it can be dependent on the stage of the animal's lactation period. As a rule an animal which has calved recently can be milked more frequently than otherwise. The numerical value, against which the recorded number of animals is compared to check whether the newly calved-down animal is allowed to be milked, can then be fixed at a lower figure.

It is to be understood that the invention is not limited to the exemplary embodiments of the invention set forth herein, but it also relates to modifications thereto within the scope of the accompanying claims.

I claim:

1. An apparatus for automatically milking animals, such as cows, comprising a computer controlled milking machine that (1) automatically connects teat cups to the teats of an animal to be milked, (2) automatically milks the animal, and (3) automatically disconnects the teat cups from the animal, an animal recognition system in communication with a computer system that governs when an animal is allowed to be milked again by said milking machine based a numerical value which is a function of the number of other animals which have been milked after the last milking of said animal, said computer systems including signaling means for selectively activating said milking machine to milk said animal on the basis of whether or not said numerical value is exceeded.

2. An apparatus according to claim 1, wherein said milking machine is in a milking parlor which has a door, said signal causing said door to open and admit only those animals wherein the number of animals that have been milked since the relevant said animal was milked exceeds said numerical value.

3. An apparatus in accordance with claim 1 wherein said numerical value consists of a proportion of the number of animals in the herd to be milked by the apparatus.

4. An apparatus in accordance with claim 3, wherein said numerical value equals approximately two-thirds of the number of animals in said herd to be milked by the apparatus.

5. An apparatus in accordance with claim 1, wherein for at least one animal in the herd to be milked said numerical value is affected by the extent that the lactation period of an animal identified by said animal recognition system has elapsed.

6. An apparatus in accordance with claim 5, wherein the numerical value provided to an animal at the beginning of the animals' lactation period equals approximately one-half of a number of animals in the herd to be milked by the apparatus.

7. An apparatus for automatically milking animals, such as cows, comprising a computer controlled milking machine that (1) automatically connects teat cups to the teats of an animal to be milked (2) automatically milks the animal, and (3) automatically disconnects the teat cups from the animal, an animal recognition system for identifying animals in communication with a computer system which receives information from said animal recognition system and controls the operations of said milking machine, said computer system selectively determining whether or not an identified animal will be milked by said milking machine on the basis that an animal is allowed to be milked again when a signal is generated by the computer system that the quantity of milk which has been obtained from said milking machine after the last milking of said animal exceeds a predetermined numerical value.

8. An apparatus according to claim 7, where said milking machine comprising an animal entry means which is opened for the entry of said animal when said signal is generated by said computer.

9. An apparatus in accordance with claim 8 comprising a milking parlor connected to said animal entry means.

10. An apparatus in accordance with claim 7, wherein said animal recognition system comprises a transponder on said animal and a sensor which operates in conjunction with said transponder and is located in the vicinity of the apparatus.

11. An apparatus in accordance with claim 10, in combination with a selection compartment, said selection compartment having two doors, one of said doors leading to said milking machine and being opened only when said predetermined numerical value is exceeded for said identified animal in said selection compartment and the other of said doors leading to an area away from said milking machine, said other door being opened when said predetermined value is not exceeded for said identified animal in said selection compartment.

12. An apparatus in accordance with claim 10 in combination with a selection compartment upon which said sensor is disposed, a closable passageway from said selection compartment to an area away from said milking machine and means for opening said passageway and leading said animal from said selection compartment to said area when a signal is generated by the computer system that the quantity of the milk which has been obtained from said milking machine after the last milking of said animal does not exceed said predetermined numerical value.

13. An apparatus in accordance with claim 12 comprising a milking parlor in which said milking machine is located, said selection compartment being provided with an entry door, a first door leading into said milking parlor and a second exit door providing access to said passageway for access to an area, said milking parlor having a further exit door which provides access to said area.

14. An apparatus in accordance with claim 13, wherein said first exit door is caused to be opened as the result of a first signal generated by said computer and said exit door can be caused to be opened by means of a second signal generated by said computer.

15. An apparatus in accordance with claim 7, comprising a milking parlor associated with a selection compartment for selectively directing animals either into or away from said milking parlor conditioned on whether or not said animal recognition signal exceeds said predetermined numerical value, said selection compartment and said milking parlor being located in a housing system.

16. An apparatus in accordance with claim 15, comprising a first exit from said milking parlor and said selection compartment which leads into a first area and an entry into said selection compartment in a second area, a route to be followed by animals in a herd of animals from said first area to said second area, said route containing at least a portion of the animals of said herd to be milked and being of such a length that is probable at least one other animal will be milked by said milking machine before an animal that has just entered said first area will have walked therefrom to said second area.

17. In a method of automatically milking animals which are allowed to move about freely in an area, such as a cowhouse or a pasture, and which are individually allowed to go to a milking parlor provided with a milking robot and there to be identified for milking, milking said animal only when, since the preceding milking turn of this animal, a period of time has elapsed which on an ongoing basis is determined at least in part by data which relate the physical condition of the animal.

18. A method according to claim 17, wherein said period of time is further determined at least in part by data which relate to the course of the animal's lactation period recorded in a computer.

19. A method in accordance with claim 17 wherein said period of time is further determined at least in part by data which relate to the historical record of the animal's milk yield which is stored in a computer.

20. A method in accordance with claim 17, wherein an activity meter is provided for said animal for determining its activity, said period of time being further determined at least in part by data related to the degree of activity of said animal provided by said activity meter.

21. A method in accordance with claim 17, wherein said period of time is further determined at least in part by data which is related to the course of the animal's estrous period as recorded in a computer.

22. A method in accordance with claim 17, wherein said period of time is further determined at least in part by the historical data of the conductivity of the milk of said animal stored in a computer.

23. A method in accordance with claim 17, wherein said period of time is further determined at least in part by data which relates to the milk temperature of said animal's milk recorded in a computer.

24. A method in accordance with claim 17, wherein said period of time is further determined at least in part by data of the somatic cell count of said animal as recorded in a computer.

25. A method in accordance with claim 17, wherein said period of time is further determined at least in part by data recorded in a computer of the historical frequency that said animal goes to said milking parlor.

26. A method in accordance with claim 17, wherein said period of time consists of a duration of time determined at least in part by further data which is related to at least one of the following: (a) the history of said animal's lactation period recorded in a computer; (b) the history of the animal's milk yield as stored in a computer; (c) the degree of activity of the animal; (d) the course of animal's estrous period recorded in a computer; (e) the history of the conductivity of the animal's milk stored in a computer; (f) the milk temperature of the animal as recorded in a computer; (g) the course of the animal's somatic cell count as recorded in a computer; and (h) the frequency that the animal goes to the said milking parlor, and providing each said further data for calculating said period of time with an appropriate weighted factor.

27. A method in accordance with claim 17, comprising calculating and determining said period of time for said animal on the basis of data recorded in a computer of the animal's physical condition, the quantity of milk produced in the last milking and the quality of said milk recorded as soon as said animal leaves said milking parlor.

* * * * *